June 23, 1970     H. STIERLIN     3,516,264
ABSORPTION REFRIGERATION SYSTEM AND METHOD FOR ITS OPERATION
Filed May 22, 1968     8 Sheets-Sheet 2

June 23, 1970   H. STIERLIN   3,516,264
ABSORPTION REFRIGERATION SYSTEM AND METHOD FOR ITS OPERATION
Filed May 22, 1968   8 Sheets-Sheet 5

INVENTOR.

June 23, 1970  H. STIERLIN  3,516,264
ABSORPTION REFRIGERATION SYSTEM AND METHOD FOR ITS OPERATION
Filed May 22, 1968  8 Sheets-Sheet 6

INVENTOR.

United States Patent Office 3,516,264
Patented June 23, 1970

3,516,264
ABSORPTION REFRIGERATION SYSTEM AND METHOD FOR ITS OPERATION
Hans Stierlin, 15 Rainweg, 8952 Schlieren, near Zurich, Switzerland
Filed May 22, 1968, Ser. No. 731,218
Claims priority, application Switzerland, May 26, 1967, 7,497/67
Int. Cl. F25b 15/00
U.S. Cl. 62—101                                 36 Claims

ABSTRACT OF THE DISCLOSURE

An absorption refrigeration system and a method for operating the same, in which the system includes a generator, a condenser, an evaporator, an absorber, and a reservoir in circuit with each other and in which some of the heat from the refrigerant vapor produced by the generator is withdrawn before the refrigerant vapor passes into the condenser and in which the withdrawn heat is transferred to the cold solution returned into the generator to thus improve the heat efficiency of the system.

BACKGROUND OF THE INVENTION

The present invention relates to an absorption refrigeration system with a pressure equalizing gas, as well as to a method of operating the system. More specifically, the present invention relates to an absorption refrigeration system which includes a generator cooperating with the other elements of the system in a new manner to thus improve the heat efficiency of the system.

An analysis of the temperature and heat conditions in the generators according to the prior art has shown that the main reason for the poor heat efficiency of these generators is a heat deficit in the heat exchanger through which liquid refrigerant flows back to the generator and in which the ammonia-poor solution heats the rich solution only to about two-thirds of the entrance temperature of the poor solution. This results in great temperature differences, which, according to the second law of thermodynamics, result in turn in a poor heat efficiency.

The reason for this fact is that the amount of rich solution to be heated per kilogram of refrigerant vapor to be produced is always greater by a kilogram than the heat transmitting poor solution flowing back to the generator.

In addition, the refrigerant vapor emanating from the generator still has a considerable heat content which is dissipated without being used in the surrounding atmosphere. Therefore, at any temperature level a too small amount of heat is available in the heat exchanger through which liquid refrigerant flows to the generator, whereas the amount of heat passing through the vapor conduit from the generator is too great.

Various attempts have already been made to equalize these differences between the heat contents. This can be practically done by guiding the refrigerant vapor after it has been rectified to the boiling point of the rich solution in counter-current to the liquid flowing through the heat exchanger to the generator, which leads to a greatly improved heat efficiency.

Another way to arrive at an improved heat efficiency is to considerably reduce the amount of rich solution passing through the heat exchanger upstream of the generator and to heat the difference between the necessary rich solution and the amount passed through the heat exchanger directly by means of the refrigerant vapor to the temperature of the generator.

These two ways of improving the heat efficiency of an absorption refrigeration system do not encounter considerable difficulties in very large refrigeration plants, since such plants are provided with mechanical pumps for circulating the liquid refrigerant, which makes such plants independent of the level differences of the various components.

In small refrigeration systems, as used in household refrigerators, the problem is considerably more difficult. Such household refrigerators operate with a thermosiphon pump which has a relatively small lifting force and which can be incorporated into the circuit only at the location where the boiling point of the rich solution is reached. This makes it extremely difficult to incorporate the heat exchanger for the liquid solution above the lowest liquid working level of the system and, since, on the other hand, it is not permissible to guide the refrigerant vapor below this level, since otherwise the condensate forming therefrom cannot be properly discharged, it is extremely difficult to bring the two media into a perfect countercurrent heat exchange.

Considerable difficulties are also encountered in small absorption refrigeration systems in carrying out the above-mentioned second solution for improving the heat efficiency of the system by branching off a part of the rich solution, since it is practically impossible to divide a liquid stream continuously into two partial streams of predetermined size without producing undue pressure losses. In addition, in order to obtain the desired result it would be necessary to proportion the partial streams automatically according to the changing operating conditions, which likewise leads to very great difficulties.

Many attempts have been made to provide small absorption refrigeration systems with an improved heat efficiency, but as far as known, these attempts have not led to practical results.

It is an object of the present invention to provide an absorption refrigeration system and a method for operation thereof leading to an improved heat efficiency.

It is a further object of the present invention to provide an absorption refrigeration system with an improved heat efficiency which can be used also in small household refrigerators.

It is an additional object of the present invention to provide a system of the aforementioned kind which will operate reliably and which can be manufactured at reasonable cost.

SUMMARY OF THE INVENTION

With these objects in view, the method according to the present invention for improving the heat efficiency of an absorption refrigeration system including a generator, a condenser, an evaporator, an absorber, and a reservoir in circuit with each other, comprises the steps of withdrawing some of the heat from the refrigerant vapor produced by the generator before the refrigerant vapor passes into the condenser and transferring the withdrawn heat to the cold rich solution returned into the generator.

On the other hand, the absorption refrigeration system according to the present invention comprises the combination of a generator for producing from a rich solution fed into the generator a refrigerant vapor and a poor solution, a condenser downstream of the generator, a vapor conduit connecting the generator to the condenser for feeding refrigerant vapor produced in the generator into the condenser, an evaporator connected to the condenser for evaporating the condensate received from the latter, a reservoir adapted to be filled up to a predetermined level with a rich solution connected to the condenser, an absorber connected at one end with the reservoir above the level of solution therein and at the other end with the evaporator, at least two conduit means, one extending between the absorber and the generator and the other between the reservoir and the generator, and means cooperating with at least one of the conduit means for transferring part of the heat of the vapor passing through the vapor conduit to the fluid passing through said at least one conduit means to thus improve the heat efficiency of the system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
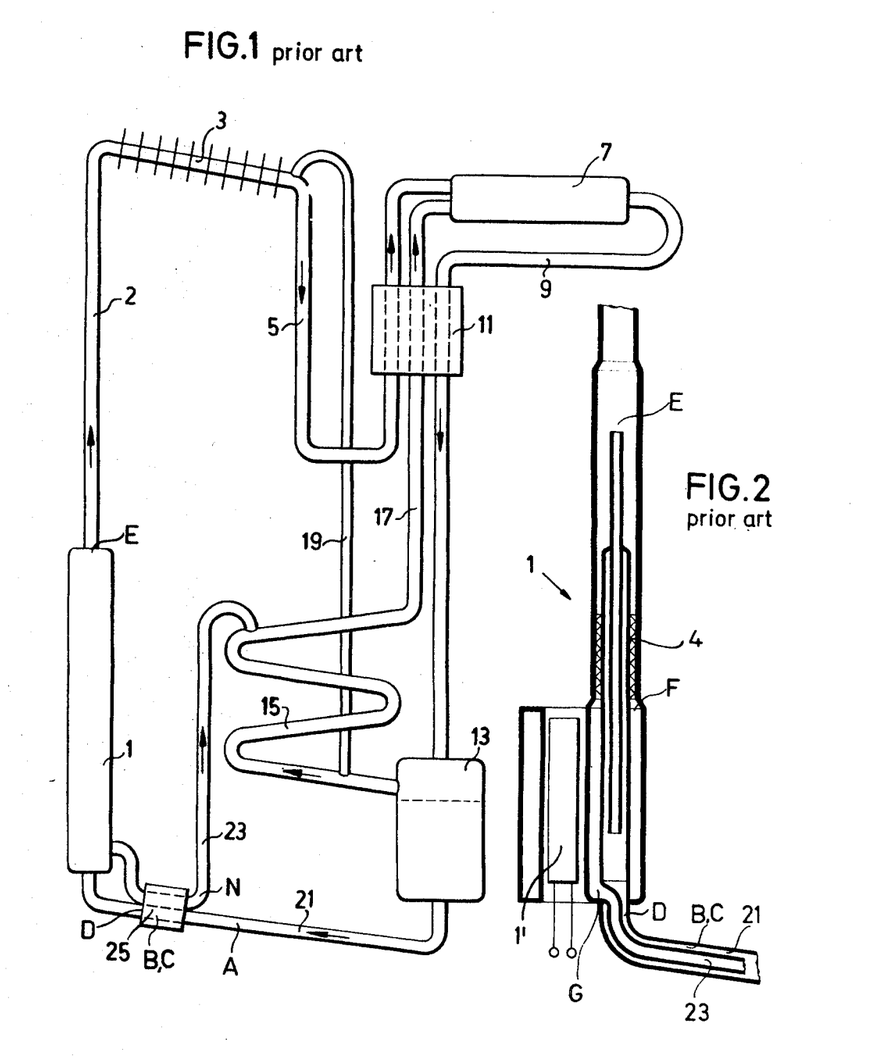
FIG. 1 is a schematic illustration of a $NH_3$—$H_2O$ household absorption refrigeration system with a pressure equalizing gas according to the prior art.
FIG. 2 is a schematic cross-section through the generator of the system shown in FIG. 1.

FIGS. 1 and 2 schematically illustrate a complete circuit and generator of an absorption refrigeration system with a pressure equalizing gas according to the prior art, as used in household refrigeration systems. As seen in FIG. 1, such a refrigeration system mainly comprises a generator 1 in which refrigerant vapor is developed from the refrigerant solution fed into the generator. The refrigerant vapor passes through a vapor conduit 2 into a condenser 3 in which the refrigerant vapor condenses. The thus developed condensate flows though the condensate conduit 5 into the evaporator 7 where the condensate is heated and evaporates. A conduit 9 leads from the evaporator 7 into the heat exchanger 11 in which the ammonia rich gas passing through the conduit 9 is heated up by heat exchange with the ammonia-poor gas passing through the heat exchanger 11 so as to cool the ammonia-poor gas as well as the condensate in the conduit 5. The conduit 9 communicates at its lower end with the main reservoir 13 filled up to a predetermined level with rich solution, which level in the reservoir 13 determines the operating liquid level of the system. The gas passing through the conduit 9 into the reservoir 13 flows from the latter into the absorber 15 in which part of the refrigerant vapor is dissolved in the poor solution flowing in counter-current to the refrigerant vapor through the absorber 15. The remainder of the gas passes in upward direction through the conduit 17 to the evaporator 7. The reservoir 13 is connected through a conduit 21 with the inlet of the generator 1, whereby part of the conduit 21 is formed as a liquid heat exchanger 25 through which also the conduit 23 passes which feeds the poor solution from the generator 1 into the uppermost part of the absorber 15.

A pressure equalizing conduit 19 connects the outlet end of the condenser 3 with the lowest portion of the absorber 15.

The present invention aims to improve the heat efficiency of such a system in the manner as will be explained below in connection with the further figures of the drawing.

Figures 3, 4:
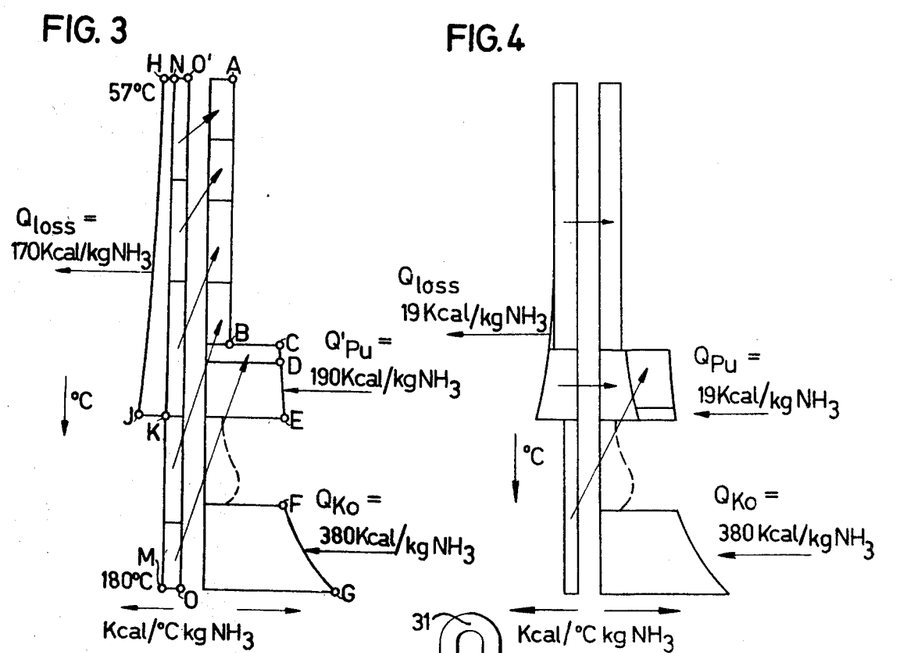
FIG. 3 is a diagram illustrating the amount of heat supplied to and discharged from the generator according to FIG. 2 at predetermined temperatures.
FIG. 4 is a diagram similar to FIG. 3 for a system according to the present invention in which at least part of the dephlegmation heat is recovered.

On the basis of FIG. 2, schematically illustrating a generator, as for instance shown in the U.S. Pat. No. 2,999,373, the thermal conditions which are obtained in such a generator will now be discussed. The diagram according to FIG. 3 shows at the abscissa of the diagram the necessary amounts of heat in Kcal./kg./° C. of temperature change, whereby on the positive side of the X-axis the supplied heat in Kcal./kg./° C. is indicated, whereas the negative side of the X-axis indicates the discharged heat. On the ordinate, the temperatures are illustrated as increasing in downward direction.

The point A illustrates the thermal condition of the rich solution as the latter leaves the reservoir 13 (FIGS. 1 and 3). This solution is heated in the heat exchanger 25 (B) and a small amount of the solution is evaporated (from C to D). Further evaporation starts at the point C. Further vapor is produced in the mixture of liquid and vapor (E) whereby the vapor bubbles lift the liquid in the thermo-siphon pump. The necessary heat is produced by the heating means 1' of the generator. The condition of the vapor-liquid mixture in the pump is shown in the diagram at the point E. Whereas the vapor passes in upward direction through the vapor conduit 2, the liquid will flow in downward direction through the rectification grid 4 (FIG. 2) and is in the lower part of the generator 1 heated by the heating means 1'. This condition is illustrated at the point F. The downwardly flowing solution is heated in the lower part of the generator to the point G. At this temperaure the poor soluion flows from the generator 1 into the conduit 23.

The amount of heat illustrated in FIG. 3 has to be furnished to the system in order for the latter to operate. Part of this heat can, as will be explained later on, be recovered through heat exchangers. The amount of heat contained in the poor solution which can be recovered in the heat exchanger is illustrated in the diagram by the rectangle NMOO'.

The letters shown in FIGS. 1 and 2 correspond to the letters shown in the diagram of FIG. 3 which indicates the thermal conditions at these points. From the diagram of FIG. 3 it will be seen that the so-called dephlegmation heat, illustrated by the area NHJK, passes with the refrigerant vapor through the vapor conduit 2 and cannot be recovered. This results in a known system with a poor solution of 10% ammonia and a rich solution of 40% ammonia and a total supplied amount of heat of 570 Kcal./kg. $NH_3$ vapor in a heat loss of 170 Kcal./kg. $NH_3$ and at a net cooling output of 280 Kcal./kg. $NH_3$ in a coefficient of performance of about 0.49.

The present invention aims to recover at least partially the amount of heat illustrated by the area NHJK in FIG. 3 which is lost in systems according to the prior art and to make this amount of heat in the refrigeration process according to the present invention at least in part usable.

The diagram of FIG. 4 illustrates the thermal conditions according to the process of the present invention. The diagram of FIG. 4 is basically arranged in the same manner as the diagram of FIG. 3, and from the diagram of FIG. 4 it can be seen that it is possible to use the heat content of the refrigerant vapor up to the condensation point by bringing the refrigerant vapor into heat exchange with the cold liquid refrigerant, for instance by passing the refrigerant vapor through the liquid heat exchanger 25. In this way, not only the poor solution passing through the heat exchanger 25, but also the refrigerant vapor will give up heat to the rich solution therethrough so that under the same conditions as to ammonia concentration, temperatures, and so on, as discussed in connection with FIG. 3, it is possible to obtain theoretically with a total amount of heat of 399 Kcal./kg. $NH_3$ supplied to the system, due to the reduction of the heat loss to 19 Kcal./kg. $NH_3$, a coefficient of performance of 0.70 instead of the theoretical value of 0.49 obtainable with the systems according to the prior art. The mentioned values are theoretical values, whereas the practical values obtained are correspondingly lower. With the known generator, as shown in FIG. 2, a coefficient of performance of 0.37 has been measured, whereas for the arrangement according to the present invention, practical values of the coefficient of performance of above 0.50 have been obtained.

A plurality of embodiments for carrying out the improved thermal process according to the present invention in absorption refrigeration systems with a pressure equalizing gas will now be discussed.

Figure 5:
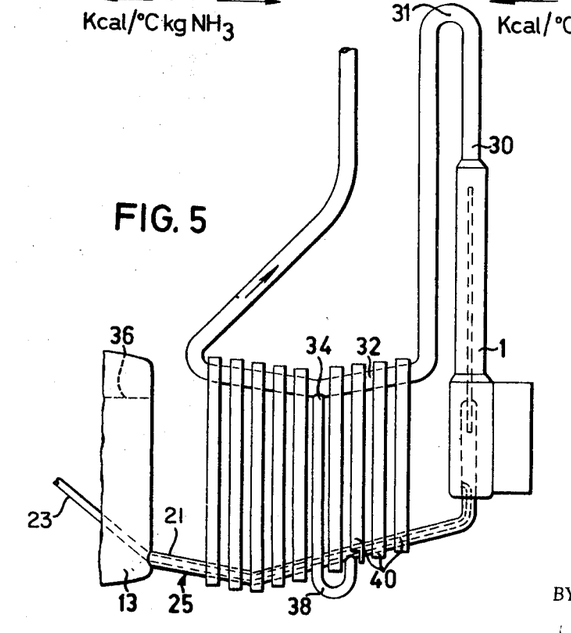
FIG. 5 is a schematic partial view of one embodiment according to the present invention in which the dephlegmation heat or the heat of condensation of the refrigerant vapor is returned by means of a heat bridge to the heat exchanger upstream of the generator.

FIG. 5 is a partial schematic view of one embodiment according to the present invention, and it is to be understood that all embodiments shown include in addition to the elements illustrated in the various figures all necessary elements of the system as shown in FIG. 1 of the drawing. As shown in FIG. 5, a vapor conduit 30 extends upwardly from the generator 1 and the conduit 30 deflects the refrigerant vapor passing therethrough through 180° at the bent part 31 of the conduit downwardly to the heat exchanger part 32 of the conduit. This heat exchanger part 32 is slightly bent intermediate its ends to provide a lowest portion 34 in which the condensate will collect. The vapor conduit 30 extends upwardly again downstream of the heat exchanger part 32 and leads to the condenser 3, as shown in FIG. 1.

FIG. 5 illustrates further a portion of the reservoir 13 in which the liquid level 36, which determines the liquid working level of the system, is indicated in dotted lines. The liquid heat exchanger 25 which connects the reservoir 13 with the generator 1 is only schematically illustrated in FIG. 5, and it is to be understood that this liquid heat exchanger 25 includes an outer tube 21 through which rich solution flows from the reservoir 13 to the generator 1 and an inner tube 23 from which poor solution from the generator passes into the absorber 15, as shown in FIGS. 1 and 2. A condensate discharge conduit 38 leads from the lowest portion 34 of the heat exchanger portion 32 into the liquid heat exchanger 25, whereby the connection to the latter is chosen in such a manner that the concentration of the condensate from the part 34 corresponds to the concentration of the liquor passing through the heat exchanger at the portion to which the conduit 34 is connected.

The heat exchanger portion 32 of the vapor conduit 30 is connected to the liquid heat exchanger 25 by a heat bridge 40 arranged and constructed in such a manner as to assure an optimum heat exchange between the elements 32 and 25. The heat bridge 40 is formed from a plurality of closely arranged substantially parallel members having a high heat conductivity, for instance aluminum. In this way, at least a part of the dephlegmation heat of the refrigerant vapor passing through the conduit 30 is transferred to the cold rich solution passing through the heat exchanger 25 to improve in this way the heat efficiency of the system and to arrive at a thermodynamic process corresponding substantially to the process illustrated in FIG. 4.

Figure 6:
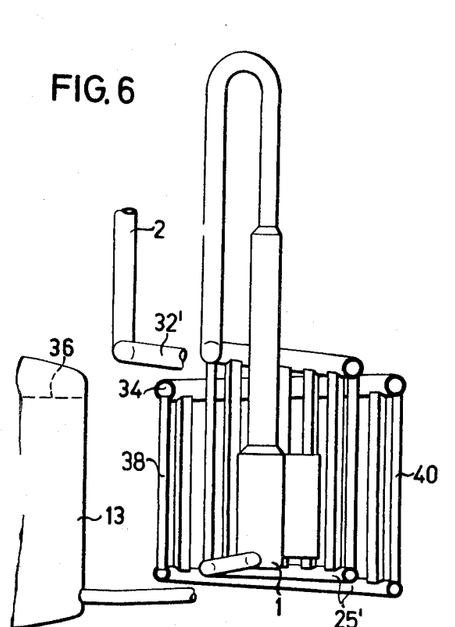
FIG. 6 is a schematic partial view of an arrangement similar to FIG. 5 in which the heat exchanger is arranged in the form of a spiral about the generator.

In the arrangement illustrated in FIG. 5, the heat bridge 40 is arranged substantially in a plane, whereas FIG. 6 schematically illustrates a similar arrangement in which the heat exchanger part 32' and the liquid heat exchanger 25' are arranged in a spiral about the generator 1 so that the hot generator is arranged in the interior of the spirals, whereby a noticeable reduction of the heat losses of the generator is obtained. The heat exchanger part 32' and the liquid heat exchanger 25' are again connected by a heat bridge 40 in the manner as discussed above.

Figure 7:
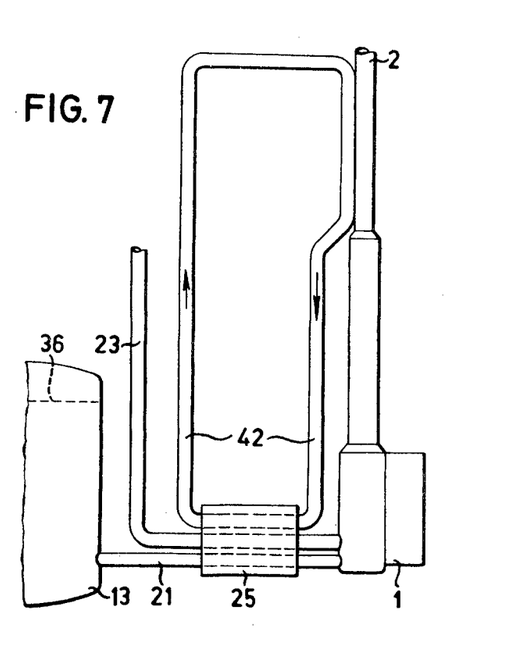
FIG. 7 is a partial view of another embodiment according to the present invention in which the dephlegmation heat is in part returned to the heat exchanger upstream of the generator by means of a closed circuit through which a secondary medium circulates.

FIG. 7 illustrates a further embodiment according to the present invention for transferring part of the heat content in the refrigerant vapor passing through the vapor conduit 2 to the liquid heat exchanger 25 to improve the thermal efficiency of the arrangement. The arrangement illustrated in FIG. 7 makes use of the known phenomenon of certain liquids which at higher temperatures have a higher specific weight than at lower temperatures and such a liquid is used in a closed secondary circuit 42, an upper portion of which extends in heat exchanging contact along a portion of the vapor conduit 2, whereas a lower portion of it extends through the liquid heat exchanger 25. As indicated by the arrows in FIG. 7, the liquid heated in the left upper portion by the refrigerant vapor passing through the conduit 2 sinks down in the right portion of the endless loop 42 and rises in the left portion thereof, as viewed in FIG. 7. The liquid is thereby continuously circulated through the endless loop 42 and withdraws part of the heat content from the refrigerant vapor and transfers this heat content to the liquid heat exchanger 25 and the solution passing therethrough.

Figure 8:
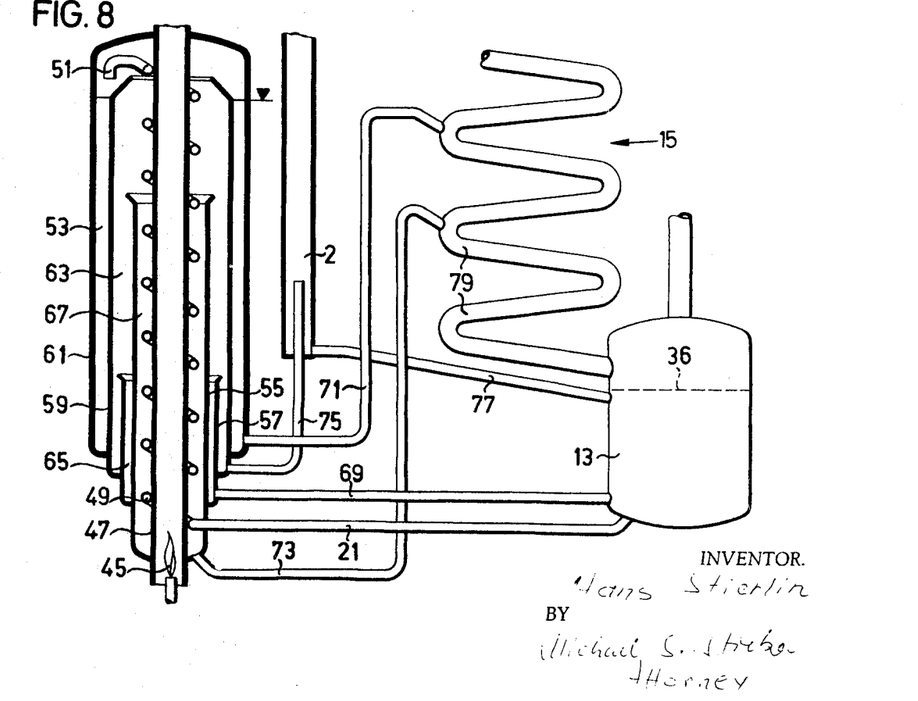
FIG. 8 is a partial schematic view of a further embodiment according to the present invention in which the heat contained in the refrigerant vapor is transferred below the liquid working level of the apparatus to the liquid heat exchanger upstream of the generator.

FIG. 8 illustrates another embodiment in which the heat rejecting refrigerant vapor passes in the heat exchanger below the liquid working level 36 of the reservoir 13 so that a flow through the conduit 75 could not take place if special provisions would not be provided. In the embodiment shown in FIG. 8, a gas flame 45 transmits part of its heat content to a heating tube 47. The heating tube 47 is surrounded by a tubular spiral 49 which forms a continuation of the conduit 21 through which the rich solution passes from the reservoir 13 to the generator. The tubular spiral 49 acts as a thermo-siphon pump which lifts the solution passing therethrough upwardly. The upper end of the tubular spiral 49 forms a downwardly directed discharge 51 which leads the solution into an outer annular space 53. Coaxially arranged about the heating tube 47 are three tubular members 55, 57 and 59 of different lengths which are connected to each other and respectively to the heating tube 47 at the lower ends and which are in turn fluid-tightly surrounded by an outer casing 61. The outermost annular space 53 receives the poor solution resulting from the rich solution fed into the lower end of the spiral 49 after ammonia vapor has been driven out therefrom, whereas the annular space 63 inwardly of the outer space 53 is filled with refrigerant vapor. The downwardly flowing vapor is partly condensed, whereby the resulting condensate is received partly in the middle condensate space 65 and the rest in the inner condensate space 67. Return conduits 69, 71 and 73 lead the separated condensates to appropriate portions of the absorber 15 (the conduits 71 and 73), respectively to the reservoir 13 (conduit 69). The practically dry vapor (about 5% moisture content) passes through the vapor conduit 2, whereby the liquid content of about 5% is lifted by the condensate pump conduit 75. The condensate developing in the conduit 2 is returned through the condensate return conduit 77 into the reservoir 13. The conduits 71 and 73 communicate with the windings of the absorber 15 at such portions thereof at which the liquor passing through the absorber 15 has the same concentration as that of the condensate passing through the conduits 71 and 73.

The rich solution passes through the conduit 21 from the reservoir 13 in the thermo-siphon pump with the tubular spiral 49 in which the solution is heated by the flame 45 and partly evaporated. A pumping action is thus obtained by the vapor bubbles developed which drive the liquid-vapor mixture upwardly and through the outlet 51 into the outer annular space 53.

By the stepwise return of the formed condensate it is possible to hold the amount of condensate which forms at the bottom of the tubular member 49 below the level 36 of the liquid in the reservoir 13 very small, that is, in the order of about 5% of the total amount of vapor produced. The work required to overcome this level difference is therefore very small. The thermodynamic loss in the pump of this small output is negligible, due to the small amount of the cooling medium to be lifted and the cooling medium, respectively the condensate, passes then through the condensate return conduit 77 into the reservoir 13. In this arrangement the heat contained in the refrigerant vapor is transferred to a very small part below the normal liquid working level 36 to the liquid heat exchanger formed by the above-described arrangement. The refrigerant vapor is rectified while passing in the same direction as the condensate through the apparatus and the condensate formed is driven by means of the vapor from the lowest liquid level again up to the normal liquid level as defined by the liquid level 36 in the reservoir 13.

Figure 9:
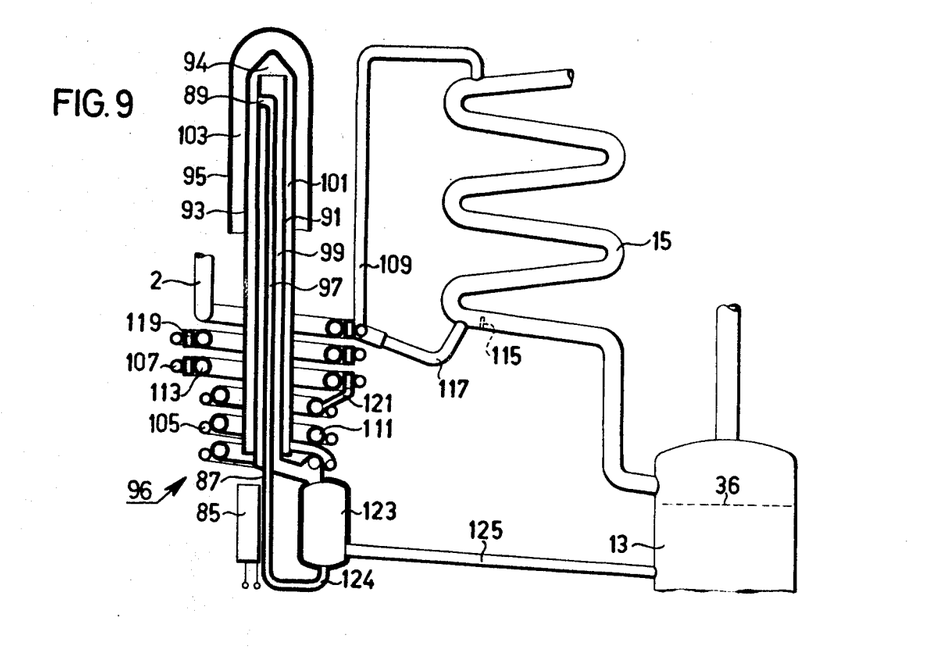
FIG. 9 is a partial schematic view of a further embodiment similar to FIG. 8 in which the liquid heat exchanger and the rectifier are located above the lowest liquid working level of the apparatus.

FIG. 9 illustrates a refrigeration system according to the present invention provided with a counter-current rectifier including a liquid heat exchanger arranged above the normal liquid working level 36 in the reservoir 13. In this arrangement, heating means 85 cooperate with a lower portion of a pumping tube 87 which is provided at its upper end with a lateral discharge opening 89. Coaxially arranged with and about the pumping tube 87 is a vapor tube 91 and a liquid tube 93, and the latter is enclosed by an insulating tube 95 only partly shown in FIG. 9. The pumping tube 87 defines a pumping space 97, whereas between the pumping tube 87 and the vapor tube 91 a vapor space 99 is formed. The air from the insulating space 103 defined between the liquid tube 93 and the surrounding insulating tube 95 may be pumped out, or this space may be evacuated after filling the same with an insulating pulverulent mass. Coaxially arranged about the pumping tube 87 are lower convolutions 105 of small diameter which are joined to upper convolutions 107 of larger diameter. A return conduit 109 connects the ends of the upper convolutions 107 with the inlet end of the absorber 15. Likewise coaxially arranged with the pumping tube 87 are the rectification convolutions 111 which communicate with convolutions of larger diameter designated as dephlegmator 113 which are arranged above the convolution 111.

A damming-up member 115 is provided in the lowest part of the absorber 15 and a curved conduit 117 leads from a portion of the absorber 15 to the left of the member 115, as viewed in FIG. 9, to flattened tubular convolutions 119. The convolutions 119 are connected at the lower end by a conduit 121 to the uppermost convolution 111 of the rectifier. The arrangement includes in addition to the reservoir 13 an additional reservoir 123 which communicates with the lower end of the pumping tube 87 through a curved conduit portion 124, whereas the vapor tube 91 as well as the lowermost convolution 111 communicate with the upper end of the additional reservoir 123. The reservoir 13 is connected and in communication with the additional reservoir 123 through conduit means 125. The lowermost convolution 105 communicates with the lower end of the liquid tube 93.

The above-described portion of the refrigeration system operates as follows:

The heating means 85 heats the lower part of the pumping tube 87 so that part of the liquor contained therein is evaporated and so that the rising vapor bubbles will drive the liquor in the pumping tube 87 in upward direction. The vapor-liquid mixture passes through the outlet opening 89 and the liquid part of this mixture will flow downwardly in the liquid space 101 whereas the vapor will pass upwardly into the dome 94 from where it passes into the vapor space 99.

The liquid is received at the lower end of the closed conduit 93 and driven upwardly as poor solution through the windings 105. The convolutions 105 are arranged for heat exchange with the rectificator windings 111 so that the poor solution passing through the convolutions 105 transfers its heat content to the liquid vapor mixture passing through the rectificator windings 111. The poor solution flows subsequently through the convolutions 107 of larger diameter whereby further heat is transferred to the rich solution passing in downward direction through the convolutions 119. The cold poor solution flows subsequently thereto through the return conduit 109 into the upper part of the absorber 15.

In order to prevent a backflow of liquid from the absorber into the reservoir 13, a damming-up member 115 is provided which dams the liquid flowing through the absorber in the region of the end of the conduit 117 communicating with the absorber so that practically the whole liquid passing through the absorber 15 will flow through the curved conduit 117 into the convolutions 119. The rich solution is heated in the convolutions 119 to the boiling point. The convolutions are dimensioned in such a manner that the solution after reaching the boiling point flows further through the rectificator windings 111 where it is rectified in counter-current with the rising vapor from the vapor steam 99. The liquid flows subsequently thereto from the rectificator windings 111 into the additional container 123 from which it will be sucked through the curved conduit 124 into the pumping tube 87.

The vapor rectified in the windings 111 in counter-current to the liquid passes into the dephlagmator 113 where it transfers at least part of its heat to the convolutions 119 and the liquid flowing therethrough. The three-part heat exchanger formed by the arrangement encompasses the large diameter convolutions 107, the flattened convolutions 119 as well as the inwardly arranged convolutions of the dephlagmator 113 all of which are thermally conductive connected to each other.

A substance acting as inhibitor to prevent corrosion, for instance sodium chromate, is placed in the solution in the reservoir 13. Since the reservoir 13 is connected to the additional reservoir 123 through the conduit means 125 the concentration of the sodium chromate in the two reservoirs 113 and 123 will be substantially identical. During start of the apparatus, the ammonia content in the additional reservoir 123 will be small so that ammonia has also to flow from the reservoir 13 into the additional reservoir. Special means may be provided to substantially equalize the concentrations in the two reservoirs, as will be explained later on in detail.

The insulating tube 95 which coaxially surrounds the pumping tube 87 and the other two coaxially arranged tubes, is provided to reduce the heat losses of the system and the insulating tube 95 will assure that the smallest amount of heat will be uselessly dissipated from the system. The insulating tube 95 is only partially shown in FIG. 9 and actually this tube extends to the lower end of the liquid tube 93.

Figure 19:
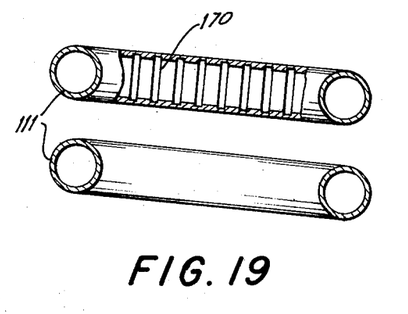
FIGS. 19 and 20 illustrate in cross-section flow-retarding means which may be used in the conduits of the system, especially the system as illustrated in FIG. 9.
Figure 20:
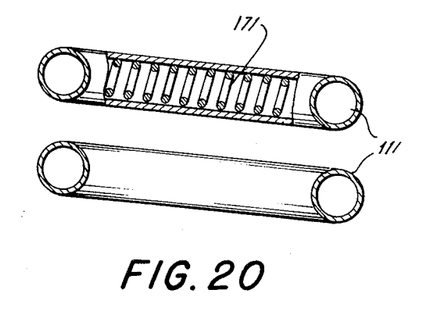

Means may be provided in the rectification convolutions 111 to decelerate flow of fluid therethrough. Such means may include spaced annular grooves 170 formed in the inner surface of the convolutions 111, as shown in FIG. 19, or a wire spiral 171 placed into the interior of the convolutions 111 as shown in FIG. 20.

Figure 10:
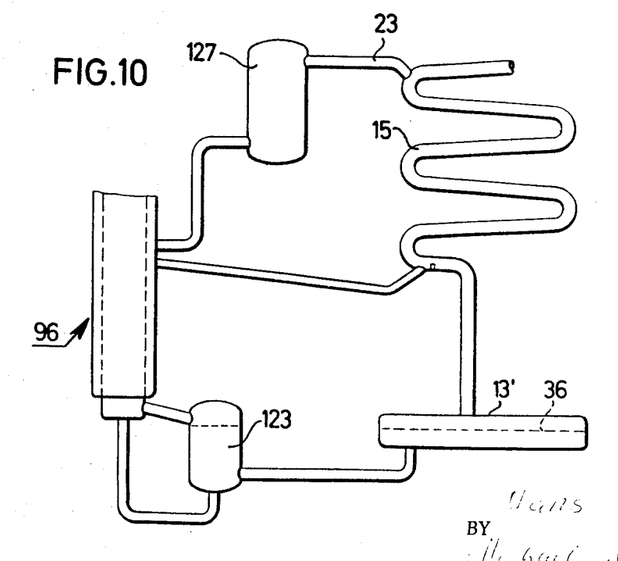
FIGS. 10–12 are schematic views of modifications of the circuit illustrated in FIG. 9 with different arrangements of the reservoirs.
Figure 11:
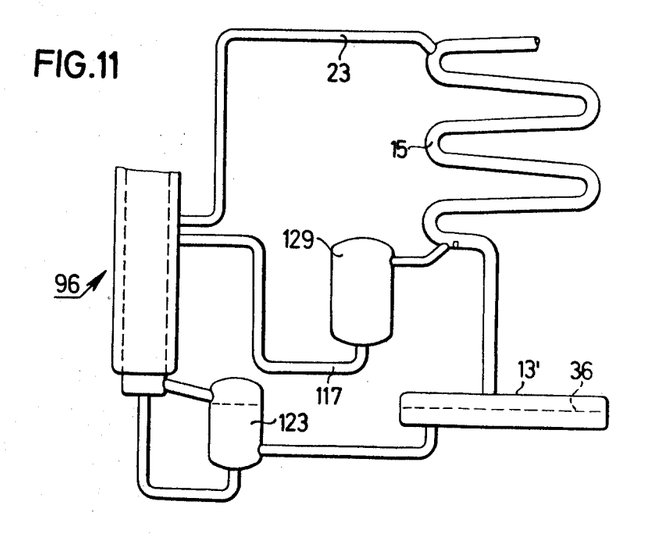
Figure 12:
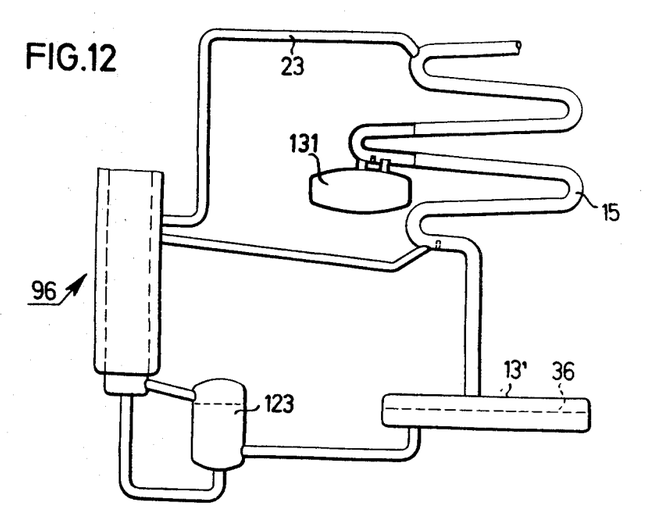

FIGS. 10–12 illustrate modifications of the arrangement illustrated in FIG. 9. In these modifications a reservoir 13' is provided instead of the large reservoir 13 shown in FIG. 9. The reservoir 13' has a large diameter so that the liquid level 36 has a larger area than in the reservoir 13 which will assure that this liquid level will be subjected to smaller variation than in the reservoir 13 so as to maintain the working liquid level of the arrangement substantially constant. The reservoir 13' has however a very small depth so that its volume will be small. In the embodiment shown in FIG. 10, there is therefore provided a further reservoir 127 in the return conduit 23 for the poor solution, whereas FIG. 11 illustrates an arrangement in which a further reservoir 129 is provided in the conduit 170 communicating with a lower portion of the absorber 15. In the embodiment according to FIG. 12, an absorber reservoir 13 is connected to an intermediate portion of the absorber 15 as shown in FIG. 12. The arrangements shown in FIGS. 10–12 have the advantage that the whole liquid of the system will be circulated so that forming of layers of different concentration will be avoided. These arrangements have however the disadvantage that they require more space and that they are more expensive to manufacture.

Figure 13:
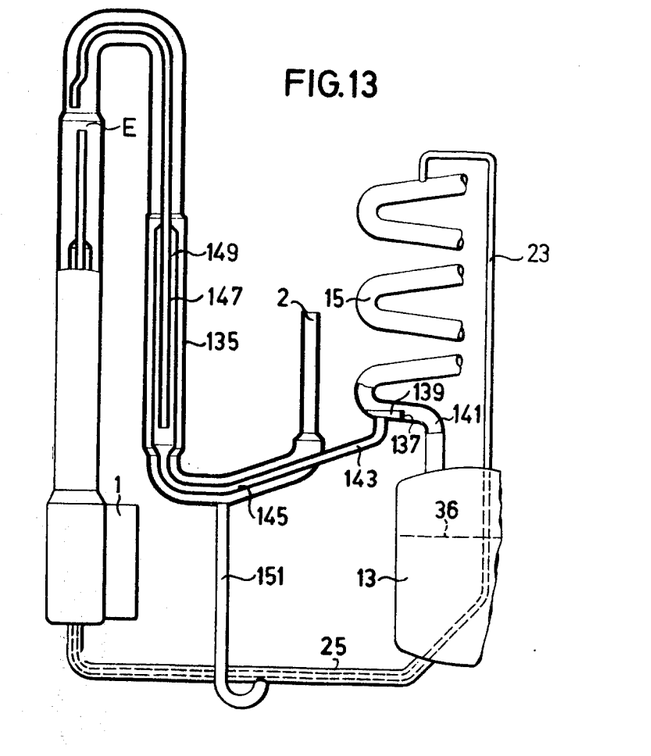
FIG. 13 is a schematic partial view of an arrangement in which the rich refrigerant solution is divided into two streams upstream of the liquid heat exchanger to obtain an improved heat efficiency.

FIG. 13 illustrates a further embodiment according to the present invention. In the embodiments discussed above, the dephlegmation heat is at least partially recovered as shown in the diagram of FIG. 4. Since in the above discussed arrangements the rich solution passes in a greater amount through the liquid heat exchanger than the backflowing poor solution, in the embodiment shown in FIG. 13 the rich solution is divided in two partial streams one of which is brought in the liquid heat exchanger 25 into heat exchange contact with the poor solution. The other partial stream of the rich solution, which corresponds to the amount of refrigeration vapor developed, is brought in another heat exchanger in contact with the refrigeration vapor so that the dephlegmation heat of the latter is transferred to this deflected part of the rich solution whereby thermodynamically the same effect is produced as in the previously discussed arrangements. The embodiment illustrated in FIG. 13 comprises a generator 1 which is substantially of the same construction as the generator illustrated in FIG. 2. A conduit 135 communicates with the upper end of the generator 1 and the conduit 135 having the configuration as shown in FIG. 13 communicates with its right lower end, as shown in FIG. 13, with the vapor conduit 2 which leads to the condenser not shown in FIG. 13. A divider element 137 is provided in the lowest part of the absorber 15 for dividing the stream of the liquid passing thereto into two partial streams, whereby the liquid level 139 of the divider will adjust itself so that the partial stream flowing through the suction conduit 145 will correspond to the amount of vapor developed in the generator from the liquid fed thereinto. The remainder of the liquid passing through the absorber 15 flows through the conduit 141 into the reservoir 13. A second siphon pump including a pumping tube 147 is provided in the upper left portion, as viewed in FIG. 13, in the conduit 145. The pumping tube 147 ends in the region E at the upper end of the pumping tube of the generator 1. The space 149 between the pumping tube 147 and the enlarged diameter left portion of the conduit 145 acts as an insulation for the pumping tube 147. A condensate discharge conduit connects the lowest point of the conduit 135 with the liquid heat exchanger 25.

The rich solution passing through the conduit 145, the amount of which corresponds to the refrigerant vapor developed in the generator 1, is pumped upwardly by the thermo-siphon pump with the pumping tube 147, operated by the refrigerant vapor in the conduit 135 and arrives as vapor-liquid mixture in the space E. The liquid content of this mixture flows into the outer portion of the generator 1 whereas the vapor phase flows out through the conduit 135. The heat efficiency of the arrangement will be improved in this way.

The arrangement shown in FIG. 13 is self-regulating, for instance if the output of the generator 1 is increased, then a correspondingly greater amount of vapor will flow through the tube 135 and the thermo-siphon pump in this conduit for the rich solution will likewise have a greater output.

Figure 21:
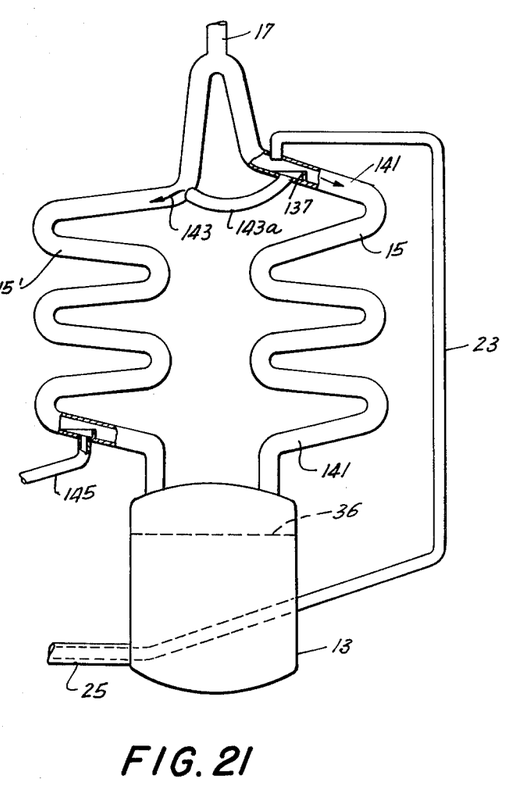
FIG. 21 is a partial schematic view of an additional embodiment similar to that shown in FIG. 13.

It is also possible to conduct the two partial streams 141 and 143 through two different absorbers. Such an arrangement is shown in part in FIG. 21, which arrangement includes in addition to the absorber 15 an absorber 15' connected in parallel thereto. A dividing element 137 is provided in the absorber 15 and the partial stream 143 is passed through a conduit 143a into an upper portion of the absorber 15' and this partial stream flows then from the lower portion of the absorber 15' through the conduit 145 through the second siphon pump arrangement 147, 149, as shown in FIG. 13 and omitted from FIG. 21. A dividing element 137 may also be provided at the point where the conduit 145 communicates with the absorber 15'.

Figure 14:
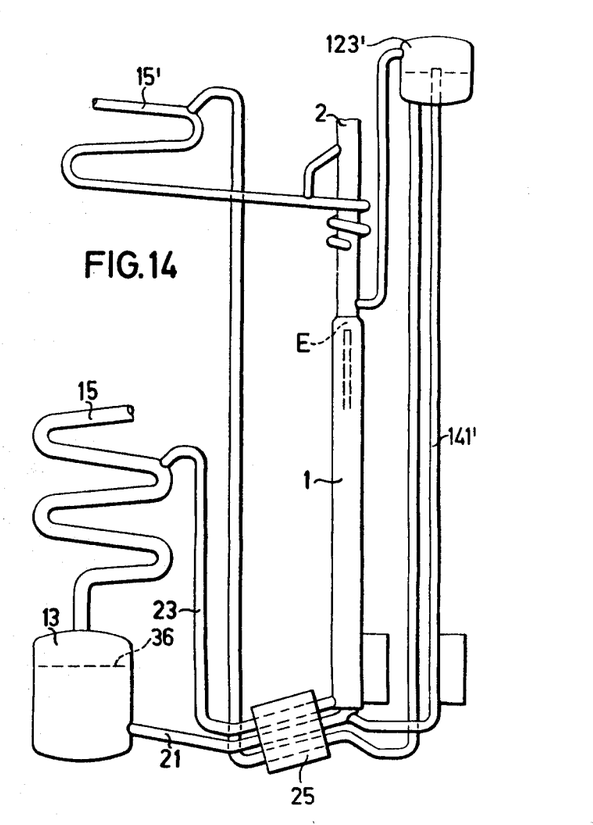
FIG. 14 is a schematic partial view of a modification of the arrangement shown in FIG. 13.

It is also possible to provide an arrangement including a second thermo-siphon pump in which the second thermo-siphon pump is not operated by means of the vapor produced by the generator but by separate heating means co-operating with the pumping tube of the second thermo-siphon pump. Such an arrangement, without a dividing element 139 as discussed in connection with FIG. 13, is illustrated in FIG. 14. In this arrangement, the pumping tube 147' of the second thermo-siphon pump is heated at its lower part by additional heating means 85' which cause, as described before, formation of a liquid-vapor mixture in the pumping tube 147' so as to pump the fluid upwardly into an additional reservoir 123' from which the liquid phase passes downwardly through the tube shown in FIG. 14 into the heat exchanger 25 and from there into a second absorber 15', whereas the vapor phase from the reservoir 123 passes into the vapor tube 2 of the generator 1. Thermodynamically, this arrangement shown in FIG. 14 has the same advantages as the arrangement illustrated in FIG. 13.

FIGS. 15–18 partially illustrate various arrangements to produce equalization of the concentration in the reservoir 13, respectively 13' and the additional reservoir 123, respectively 159. As mentioned before, an inhibitor for preventing corrosion is placed in the solution contained in the resevoirs of the system, and as further mentioned before, during starting of the system, the ammonia concentration in the additional reservoir 123 is relatively small. The arrangements shown in FIGS. 15–18 serve to equalize the concentration of the inhibitor as well as the ammonia concentration in the two reservoirs.

Figure 15:
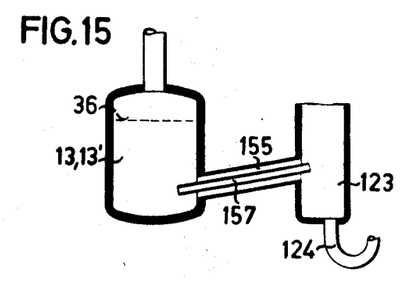
FIGS. 15–18 are partial cross-sections illustrating details of arrangements according to the present invention in which an additional reservoir is provided together with means for obtaining equalization in the concentration of the refrigerant solution and corrosion resisting material furnished to the solution in the two reservoirs.

In the arrangement shown in FIG. 15, the two reservoirs 13, respectively 13', and the additional reservoir 123 which is connected by the bent tube 124 to the pumping tube 87, as shown in FIG. 9, are connected by two coaxial tubes, that is, an outer tube 155 and an inner tube 157 of smaller diameter coaxially arranged in the outer tube. This arrangement will provide continuous circulation of the fluids in the two reservoirs.

Figure 16:
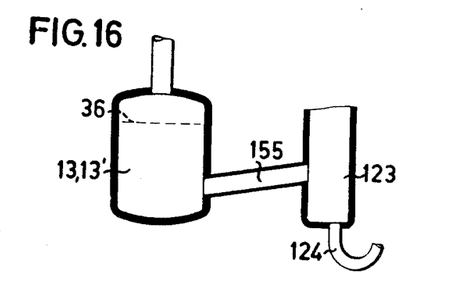

In the arrangement shown in FIG. 16, the reservoir 13, respectively 13′, is connected to the additional reservoir 123 by a single tube 155 which rises from a bottom portion of the reservoirs 13, respectively 13′, upwardly into the additional reservoir 123 so that by this arrangement also a continuous fluid circulation between the two reservoirs will be obtained.

Figure 17:
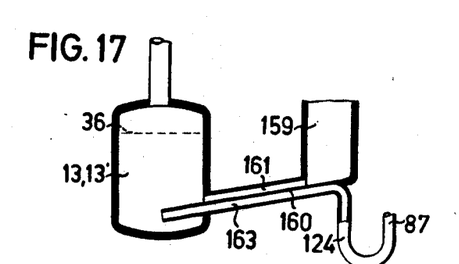

In the arrangement shown in FIG. 17, the tubular portion 124 connected to the pumping tube 87 does not communicate with the additional reservoir 159, but the conduit portion 124 is extended by a conduit 163 into the reservoir 13, respectively 13′, whereas the additional reservoir 159 is connected to the reservoir 13, respectively 13′, by a downwardly extending passage 161 parallel to the conduit portion 163 and separated therefrom by a wall 160. In this arrangement, liquid will be continuously sucked through the conduit portions 163 and 124 into the pumping tube 87, while liquid from the additional reservoir 159 will flow through the passage 161 into the main reservoir.

Figure 18:
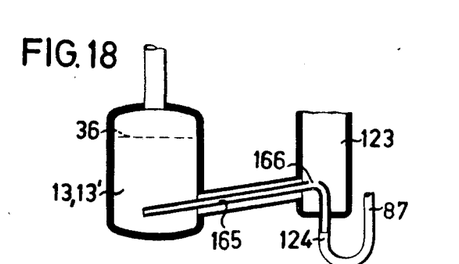

The arrangement shown in FIG. 18 is similar to that shown in FIG. 17, that is, the pumping tube 87 is connected through the conduit portion 124 with a conduit portion 165 which extends into the reservoir 13, respectively 13′, and the tube portion 165 is arranged in an outer tube of larger diameter which connects the two reservoirs and which extends downwardly from the additional reservoir 123 into the main reservoir. In addition, the tube portion 165 is provided in the additional reservoir 123 with a suction opening 166 so that part of the liquid contained in the additional reservoir will be sucked directly through the opening 166 into the pumping tube 87, whereas another part from the additional reservoir 123 may flow through the outer tube surrounding the tube 165 into the main reservoir.

It will be understood that each of the elements described above, or two or more together, may also find a useful application in other types of absorption refrigeration systems differing from the types described above.

While the invention has been illustrated and described as embodied in an absorption refrigeration system with an improved heat efficiency, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an absorption refrigeration system with a pressure equalizing gas, the combination of a generator for producing from a rich solution fed into the generator a refrigerant vapor and a poor solution; a condenser downstream of said generator; a vapor conduit connecting said generator to said condenser for feeding refrigerant vapor produced in said generator into said condenser; an evaporator connected to said condenser for evaporating the condensate received from said condenser; a reservoir adapted to be filled up to a predetermined level with a rich solution and connected to said condenser; an absorber communicating at one end with said reservoir above the level of solution therein and at the other end with said evaporator; at least two conduit means, one extending between said absorber and the generator and the other between said reservoir and said generator; and means cooperaing with at least one of said conduit means for transferring part of the heat from the vapor passing through said vapor conduit to the fluid passing through said at least one conduit means to thus improve the heat efficiency of the system.

2. The combination as defined in claim 1, wherein said conduit means are arranged to form a heat exchanger.

3. The combination as defined in claim 2, wherein said heat transfer means comprises a heat bridge of a material having a high thermal conductivity extending between a portion of said vapor conduit above the level of solution in said reservoir and a portion of said heat exchanger located below said level.

4. The combination as defined in claim 3, wherein said heat bridge is formed by a plurality of closely spaced substantially parallel metal members extending between said portions.

5. The combination as defined in claim 3, wherein said portions of said heat exchanger and said vapor conduit are arranged in a spiral and wherein said generator is arranged in the interior of said spiral.

6. The combination as defined in claim 3, wherein said heat transfer means comprise a secondary circuit including a conduit filled with an auxiliary fluid arranged in a closed loop and having portions closely adjacent and in heat exchange with said portion of said liquid heat exchanger and said vapor conduit.

7. The combination as defined in claim 6, wherein said portion of said vapor conduit extends in substantially vertical direction above the level of liquid in said reservoir and said portion of said liquid heat exchanger extends below said level.

8. The combination as defined in claim 7, wherein said auxiliary fluid is a liquid having, when heated to a predetermined temperature, a specific gravity greater than at a temperature below said predetermined temperature, and wherein said liquid in said secondary circuit is heated by said portion of said vapor conduit to said predetermined temperature and cooled by said portion of said heat exchanger to a temperature below said predetermined temperature.

9. The combination as defined in claim 1, wherein said heat transfer means is arranged to transfer part of the heat contained in the vapor emanating from the generator at an elevation below the level of liquid in said reservoir to said at least one conduit means.

10. The combination as defined in claim 1, wherein said heat transfer means comprise means for rectifying the vapor passing through said vapor conduit and means for pumping part of the condensate by the vapor produced by the generator up to the level of the solution in said reservoir.

11. The combination as defined in claim 10, wherein said rectifying means include a plurality of concentrically arranged tubular members receiving condensate of different concentration and means for transferring the condensate from said plurality of tubular members to different points of said system.

12. The combination as defined in claim 11, wherein said means for transferring said condensate comprise a plurality of conduits communicating at opposite ends respectively with said tubular members and with portions of said absorber in which the fluid passing therethrough has substantially the same concentration as the condensate in the respective tubular member.

13. The combination as defined in claim 11, wherein said generator includes an upright heating tube and a pumping tube forming a continuation of said conduit means and extending in a helix about said heating tube, and wherein said tubular members are arranged coaxially with said heating tube.

14. The combination as defined in claim 1, wherein said heat transfer means include rectifying means for rectifying the vapor passing through said vapor conduit and wherein said heat transfer means comprise heat exchange means for transferring heat from the rectified vapor to the condensate formed in said rectifying means.

15. The combination as defined in claim 14 wherein said rectifying means and said heat exchange means are arranged above the liquid level in said reservoir.

16. The combination as defined in claim 14 wherein said generator includes an upright pumping tube and heating means cooperating with a lower portion of said pumping tube, and including an additional reservoir communicating with said first named reservoir, the lower end of said pumping tube communicating with one of said reservoirs and the liquid in said first and in said additional reservoir having different temperatures and concentration.

17. The arrangement as defined in claim 14, wherein said generator includes an upright pumping tube and heating means cooperating with a lower portion of said pumping tube, and wherein said rectifying means and said heat transferring means are arranged about said upright pumping tube.

18. The arrangement as defined in claim 17, wherein said rectifying means and said heat transfer means extend in helixes about said pumping tube.

19. The arrangement as defined in claim 17, wherein said rectifying means includes a helically wound conduit extending about said pumping tube and including means in said helically wound conduit for decelerating flow of fluid therethrough.

20. The combination as defined in claim 19, wherein said decelerating means are in the form of spaced annular grooves in the interior of said helically wound conduit.

21. The combination as defined in claim 19, wherein said decelerating means comprise a wire spiral in the interior of said helically wound conduit.

22. The combination as defined in claim 16, and including means for equalizing the concentration of liquid in said reservoirs.

23. The combination as defined in claim 22, wherein said equalizing means comprises a pair of coaxial conduits extending between said reservoirs.

24. The combination as defined in claim 22, wherein said equalizing means comprises a pair of conduits extending between said reservoirs and arranged for heat exchange of the fluid passing therethrough.

25. The combination as defined in claim 22, wherein said lower end of said pumping tube communicates through a conduit passing through said additional reservoir with said first-named reservoir and wherein said equalizing means comprises an opening in a portion of said conduit located in said additional reservoir.

26. The combination as defined in claim 22, wherein said lower end of said pumping tube communicates with said additional reservoir and wherein said equalizing means comprises a conduit extending upwardly inclined from a bottom portion of said first reservoir to said additional reservoir.

27. The combination as defined in claim 1, and including in addition to said reservoir at least one further liquid storing means in circuit with said system.

28. The combination as defined in claim 1, wherein said generator comprises an upright pumping tube, heating means cooperating with a lower portion of the pumping tube, and a liquid return tube arranged about said pumping tube and the latter communicating at the upper end thereof with said return tube, said vapor conduit being in part arranged between said tubes coaxially therewith and communicating with the upper ends of said tubes.

29. The combination as defined in claim 1, wherein said one conduit means comprises a conduit communicating with a lower portion of said absorber and an upper portion of said generator so that the solution passing through said absorber is divided into two streams, and wherein said heat transfer means comprises a portion of said vapor conduit extending about said conduit of said one conduit means.

30. The combination as defined in claim 29, and including a thermo-siphon pump in said conduit and operated by the vapor passing through the vapor conduit.

31. The combination as defined in claim 30, wherein said thermo-siphon pump is arranged above the level of liquid in said reservoir.

32. The combination as defined in claim 29, and including a second absorber connected in parallel with said first named absorber and communicating at opposite ends with said evaporator and said reservoir, said one conduit means comprises also a conduit communicating with the upper portion of said second absorber and a lower portion of said generator, and including means for transferring part of the fluid in said upper portion of said second absorber into said first absorber.

33. A method for improving the heat efficiency of an absorption refrigeration system including a generator, a condenser, an evaporator, an absorber and a reservoir in circuit with each other, said method comprising the steps of passing refrigerant vapor produced in the generator into the condenser; withdrawing some of the heat from the refrigerant vapor during passage thereof in vapor form from the generator to the condenser before the refrigerant vapor reaches the condenser; and transferring the heat withdrawn from the vapor to cold rich solution returned into the generator.

34. The method as defined in claim 33 wherein said generator includes an upright pumping tube and including the step of applying heat to said pumping tube, said heat applied to said pumping tube comprising all of the exterior heat supplied to said system.

35. The method as defined in claim 33, wherein said system includes pumping means for circulating the fluid through the system and a plurality of reservoirs containing liquor of different concentrations, and including the step of circulating at least 30% of the total liquor content in said reservoirs by said pump means to at least partly equalize said concentrations.

36. The method as defined in claim 33, wherein heat is transferred to said cold rich solution by passing said vapor in heat exchange and in countercurrent to said cold solution.

References Cited

UNITED STATES PATENTS

| | | | |
|---|---|---|---|
| 1,922,713 | 8/1933 | Randel | 62—101 X |
| 2,191,551 | 2/1940 | Ullstrand | 62—489 |
| 2,192,338 | 3/1940 | Ullstrand | 62—489 X |
| 2,203,074 | 6/1940 | Anderson | 62—489 |
| 2,479,062 | 8/1949 | Edel | 62—489 |
| 2,721,455 | 10/1955 | Hellstrom | 62—496 X |
| 2,772,544 | 12/1956 | Lenning | 62—496 X |
| 2,999,373 | 9/1961 | Stierlin | 62—497 |
| 3,273,350 | 9/1966 | Taylor | 62—101 |
| 3,279,202 | 10/1966 | Eberz | 62—496 X |
| 3,440,832 | 4/1969 | Aronson | 62—101 |

LLOYD L. KING, Primary Examiner

U.S. Cl. X.R.

62—476, 489, 496